United States Patent

[11] 3,607,030

| [72] | Inventor | Robert M. Lattig<br>Pocatello, Idaho |
|---|---|---|
| [21] | Appl. No. | 738,566 |
| [22] | Filed | June 20, 1968 |
| [45] | Patented | Sept. 21, 1971 |
| [73] | Assignee | Leprechaun Mining and Chemical, Inc.<br>Las Vegas, Nev. |

[54] PROCESS FOR THE DIRECT PRODUCTION OF CONCENTRATED WET-PROCESS PHOSPHORIC ACID
7 Claims, 1 Drawing Fig.

| [52] | U.S. Cl. | 23/165, 23/122 |
|---|---|---|
| [51] | Int. Cl. | C01b 25/22 |
| [50] | Field of Search | 23/122, 165, 165 D |

[56] References Cited
UNITED STATES PATENTS

| 2,504,544 | 4/1950 | Legal et al. | 23/165 |
|---|---|---|---|
| 2,710,247 | 6/1955 | Knowles et al. | 23/165 |
| 3,161,467 | 12/1964 | Hignett et al. | 23/165 |
| 3,326,635 | 6/1965 | Davenport et al. | 23/165 |
| 3,420,628 | 1/1969 | Robinson | 23/165 |

*Primary Examiner*—Oscar R. Vertiz
*Assistant Examiner*—Gregory A. Heller
*Attorney*—Brady, O'Boyle & Gates ABSTRACT: A process of producing concentrated phosphoric acid of approximately 50%–56% $P_2O_5$ utilizing relatively dilute sulfuric acid as an acidulent for phosphate rock, conditioning the initially formed acidulate by admixture with recycled dried indurated gypsum granules, curing and drying the admixture to form a readily filterable acidulate, leaching and washing the acidulate to directly produce concentrated phosphoric acid of low fluorine content.

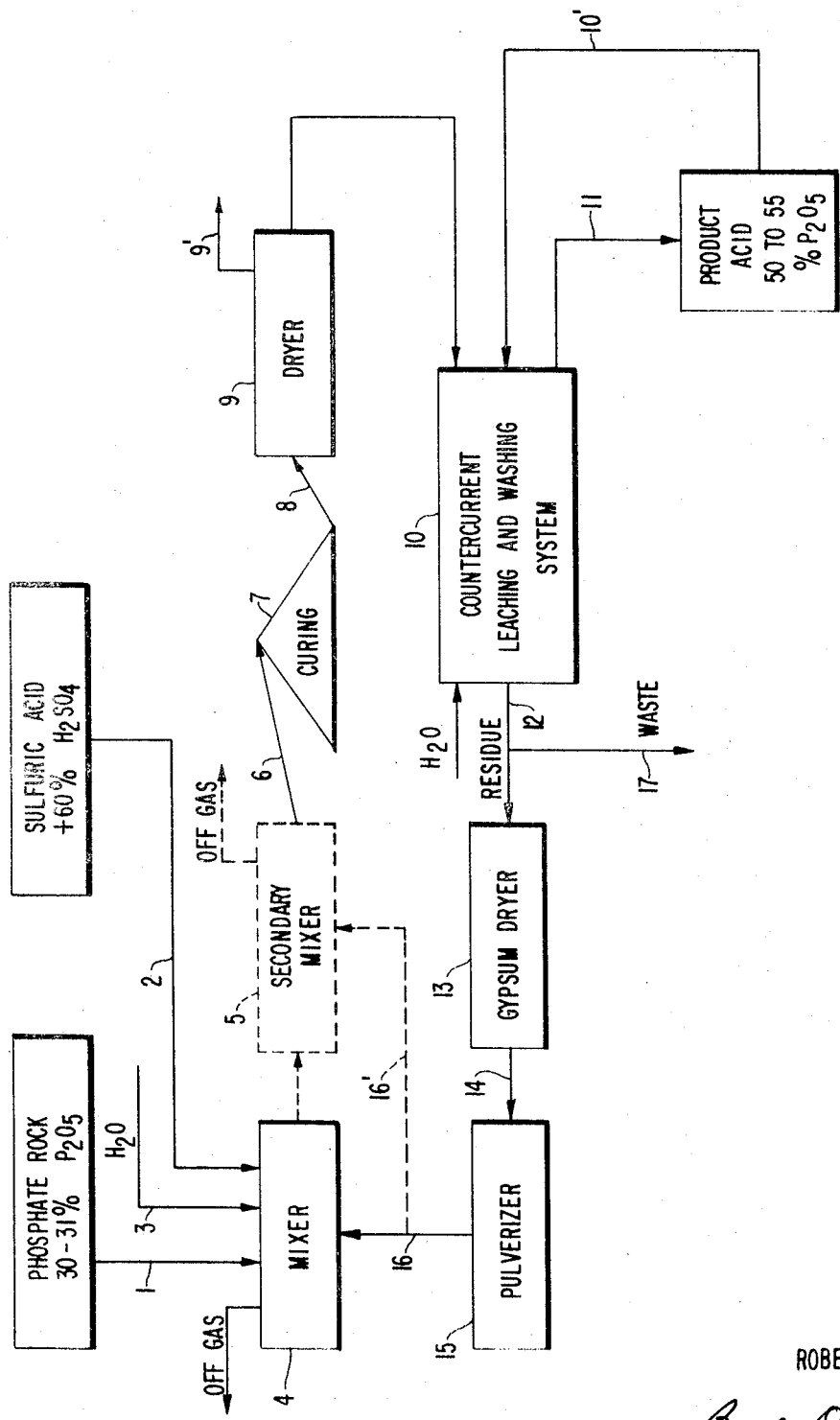

PROCESS FOR THE DIRECT PRODUCTION OF CONCENTRATED WET-PROCESS PHOSPHORIC ACID

BACKGROUND OF THE INVENTION

This invention relates to an improved process for the direct production of concentrated wet-process phosphoric acid.

The invention pertains to the production of concentrated phosphoric acid by a wet-process wherein commercial or byproduct sulfuric acid may be utilized as the acidulating agent for phosphatic material, inclusive of relatively low-grade phosphate ores, and the initial acidulate formed is conditioned to advantageously modify its physical characteristics, rendering it amenable to effective filtration to produce a concentrated product acid of 50–55% $P_2O_5$.

1. Field of the Invention

The two main sources of phosphate are bone ash and mineral phosphate. Bone ash is purer than the mineral phosphates and as far as the limited supply permits is used for making phosphoric acid and monocalcium phosphates for baking powders. The mineral phosphates are the source materials for the manufacture of fertilizers, such as superphosphate and triple superphosphate. In the United States, large deposits of phosphates are found in Florida and Tennessee; these deposits contain a relatively high percentage of $P_2O_5$, Florida land pebble containing from 30–35 percent $P_2O_5$; Tennessee blue rock from about 25–37 percent $P_2O_5$, and Florida hard rock containing about 25–37 percent. There are lesser, although quite substantial deposits in the United States such as the Western phosphates which contain 26–32 percent $P_2O_5$, and a relatively high organic content which, with suitable processing, are available for phosphoric acid production. While the present invention is not limited to the treatment of such Western phosphate ores, its efficacy is indicated by the fact that such Western phosphates can be processed at a relatively low cost per unit of $P_2O_5$ recovered.

2. Description of the Prior Art

In certain fields, notably for the production of triple superphosphate fertilizers a concentrated phosphoric acid is required for the acidulation of the phosphate rock. In the past, such concentrated acid has been produced by two general methods, namely, a thermomethod in which tricalcium phosphate is heated in the presence of carbon and silica in a blast or electric furnace to evolve elemental phosphorus which is oxidized and dissolved in water, and the more widely used wet method in which phosphate rock is acidulated with sulfuric acid to produce a slurry of phosphoric acid and calcium sulfate followed by filtration separation of the gypsum and evaporation concentration of the separated phosphoric acid.

In the usual or conventional wet method of producing strong phosphoric acid, such as the Dorr strong acid process, calcined ground rock is acidulated first with weak phosphoric acid and subsequently with a mixture of phosphoric acid and relatively strong sulfuric acid (94% $H_2SO_4$ approximately), and the acidulate is filtered to remove gypsum and to recover a 30–32 percent $P_2O_5$ acid. In order to produce a concentrated acid of about 35 percent $P_2O_5$ the initial acid is evaporated, usually in a single-effect vacuum evaporator. Higher concentrations can be obtained by further evaporation using multiple-effect evaporators. In this conventional method, the evaporation of the initial acid is attended with considerable difficulties and adds considerably to the cost of the product acid.

The described relatively expensive method of producing concentrated phosphoric acid is well known in the art and numerous suggestions have been advanced of methods to produce a concentrated phosphoric acid without resort to the final, expensive evaporation concentration. Of these, the methods which have commanded the attention of the art are described in U.S. Pat. No. 2,504,544 and U.S. Pat No. 3,161,465.

U. S. Pat No. 2,504,544 relates to a method of manufacturing strong phosphoric acid of low fluorine content by a wet-process without resort to evaporation. In such method, ground phosphate rock and hot concentrated sulfuric acid (98% $H_2SO_4$) are admixed in a suitable reaction zone and after reaction is directly heated at elevated temperatures for a short period of time to form a a clinkerlike product which is passed directly and without cooling to a series of countercurrent leaching tanks, where the nearly-spent clinker is washed with water and the hot clinker with strong and progressively weaker phosphoric acid.

U.S. Pat. No. 3,161,465 describes a method of producing strong acid of relatively low fluorine content without evaporative concentration of the initially formed acid. In this process finely ground calcined phosphate rock is acidulated with heated fuming sulfuric acid and the acidulate is passed to an insulated rotating drum and held at a temperature of 550–600 F. for a period of 20–60 minutes. The hot granules of acidulate are passed to a countercurrent quenching and leaching system and are first contacted with relatively strong phosphoric acid and progressively leached with dilute acid derived by adding wash water to the terminal stage of the leaching system to recover a product acid of 50–60 percent $P_2O_5$.

SUMMARY OF THE INVENTION

The invention is characterized, among other things, by the direct production of strong phosphoric acid of approximately 50–55 percent from phosphate material including Western rock without resort to evaporative concentration. The process invokes the concepts of utilizing as the essential acidulating agent commercial sulfuric acid of 60–75 percent $H_2SO_4$ or byproduct sulfuric acid and the concept of modifying the condition and physical structure of an initially formed pasty acidulate by the addition of gypsum anhydrite, derived in the process to form a granulated acidulate of improved characteristics, such as to enable recovery of $(P_2)_5$ from the acidulate by an economical leaching and washing operation.

It might be noted at this point, with respect to the prior art patents discussed above that the reaction of fuming sulfuric acid with phosphate rock leads to the formation of calcium sulfate anhydrite, while the use of a more dilute sulfuric acid leads to the formation of calcium sulfate dihydrate.

The major object of the invention is to derive concentrated phosphoric acid from phosphate rock utilizing commercial or byproduct sulfuric acid as an acidulate.

Another object of the invention is to produce concentrated phosphoric acid by the acidulation of phosphate rock with commercial or byproduct sulfuric acid and to modify the initial acidulate by admixture with calcium sulfate anhydrite to produce a product which is readily leachable or filterable.

A further object is to produce strong phosphoric acid from Western phosphates using commercial or byproduct sulfuric acid as an acidulating agent and modifying the originally formed acidulate to impart the filtering characteristic of a gypsum anhydrite.

Considered briefly, the process embodies a digestion stage in which ground phosphate rock, preferably calcined, is reacted with sulfuric acid containing 60 to 97 percent $H_2SO_4$ at temperatures of the order of about 100° C. to form an acidulate of phosphoric acid and calcium sulfate. Effective reaction between the rock and acid involves, among other things, an effective wetting of the rock by the acid. In the process the sulfuric acid may be admixed with water or dilute phosphoric acid to provide the desired fluidity for effective wetting. Addition of water or dilute phosphoric acid also serve to control the rate of gas evolution and setting characteristics with the result that the acidulate is passed to a subsequent conditioning stage as a relatively porous product. The digestion system may include any apparatus of choice. In the preferred operation it is found that a covered pug mixer operates very effectively. In operation, the rock is preferably fed to the pug mixer by a screw conveyor mounted to a small feed bin having an attached vibrator and of sufficient capacity to keep the screw full at all times and maintain a substantially steady and constant speed rate. The acid may be fed to the pug mixer by a pump through a rotometer and sparger. Water may also be fed to the pug mixer through a rotometer and separate sparger. Gases evolved during the reaction, e.g. fluorine, are withdrawn and passed into a scrubbing system. In the digestion stage the reaction between the rock and acid results in the formation of a magma or slurry acidulate of phosphoric acid and calcium sulfate. Such initial acidulate, either in a later stage of the digester or in a separate pug mixer, is homogeneously admixed with proportioned amounts of dried and sized gypsum derived in the operation, to essentially convert the initial set or pasty acidulate into a semidried granular acidulate, which may be handled in conventional material-handling equipment. This conditioning operation serves to introduce into the system a substantially uniform feed of a relatively stable anhydrite which is found to aid in the recovery of a clarified acid in the subsequent leaching operation. While not advancing any precise mechanism of this improved character of the conditioned acidulate is appears that the stable large particles of the gypsum anhydrite introduced into the acidulate provide a nucleus ion which the calcium sulfate particles in the acidulate precipitate upon or agglomerate to and thus form a composite granulate of improved filtering characteristics.

The semidried granular acidulate incorporating the recycled gypsum is passed to a curing stage, such as a suitable den, where the reactions initiated in the digestion stage are allowed to run to completion to insure maximum conversion of the $P_2O_5$ of the rock and concomitantly improve the physical characteristics of the granulate. The acidulate is retained in the curing stage for a period of from approximately one to three days, i.e. for a sufficient time to insure completion of the reaction.

The reacted and conditioned acidulate is passed from the curing stage to a drier wherein the material is heated to elevated temperatures to evolve excess water and some contained fluorine. The drying system may conveniently comprise a rotary indirectly heated drier through which the acidulate flows concurrently to the source of heat and in which such acidulate is heated to a temperature of the order of about 220° C. The retention time in the drier should be sufficient to achieve the desired drying effect and may be of the order of about 20 minutes or more. The gases and vapors evolved in the drying stage are withdrawn and passed to a scrubber to recover the fluorine values. While the main function of the drying operation is to remove water and some fluorine, and thus produce a more concentrated acidulate, it has been found that such drying operation subserves a second function, that is to further condition the granular acidulate for the subsequent leaching step. The drying improves the stability of the granule particularly in indurating the granule, thus resisting breakdown or degradation in the leaching step in the area of high acid concentration; this in turn aids in the production of a relatively solid free acid. Additionally, the removal of water in the drier tends to convert the gypsum of the acidulate to the desired anhydrite form.

The dried conditioned acidulate is then passed to a suitable countercurrent leaching and washing system wherein the substantially dry hot acidulate is successively leached with strong phosphoric acid, and progressively with weaker acid, and finally washed with water. Such leaching and washing system may comprise treatment on a continuous filter, countercurrent washing in a series of tanks or other suitable methods. The effluent product acid of approximately 50-55 percent $P_2O_5$ derived from the leaching and washing system is passed to a suitable storage tank as product acid. A portion of such acid may be recycled to the first quenching stage of the leaching and washing system. The acid used for the initial quenching may also be recovered from an intermediate point in the leaching system. It has been found as a result of considerable experimentation and tests that such initial quench acid liquid should contain at least about 46 percent $P_2O_5$ to properly condition the granules for further leaching and washing. It has been ascertained that if the hot granules are contacted with quench liquor containing less than approximately 40 percent $P_2O_5$ they tend to break down into fine particles which remain suspended in the washing liquors rendering filtration difficult. Utilizing quench liquor of approximately 46 percent concentration also functions to drop out the iron and aluminum compounds, thereby obtaining a clearer liquor overflow.

A portion of the residue from the leaching and washing system is passed waste and the predetermined remainder is passed directly to a drier in which the gypsum is dried at a temperature in excess of about 260° C. In these circumstances the gypsum is converted to the anhydrite form. The finally dried gypsum product is pulverized, classified and passed to the previously described conditioning stage.

DESCRIPTION OF THE DRAWING

The single drawing is a flowsheet depicting the principles of the improved process for the direct production of strong phosphoric acid of low fluorine content.

DESCRIPTION OF THE PREFERRED EMBODIMENT

As those skilled in the art will appreciate, the initial reaction mixture in the digestion stage is proportioned so that the amount of acid provided is sufficient to convert substantially all of the phosphatic material of the ore into phosphoric acid and calcium sulfate. Under normal circumstances the quality of acid employed, based on the analysis of the phosphatic charge material is approximately in stoichiometrical proportions for complete reaction. It is to be observed that in the described method, unlike many earlier processes, the temperature control in the reaction stage is of no particular moment. In most such earlier processes the temperature in the digestion stage was rather carefully controlled to insure the formation of calcium sulfate in the semihydrite or dihydrite from. In the process of the invention, the physicochemical condition of the ultimate acidulate is not essentially limited to the reaction temperature conditions, since the physical character of the ultimate acidulate is modified and established by the described conditioning operation. As indicated in the drawings, a ground phosphate rock preferably in calcined from and containing of the order of 30-31 percent or more of $P_2O_5$ reduced to a suitable size of the order of about 90 percent minus 100 mesh is charged from a storage source through line 1 uniformly and in predetermined amounts established by suitable well-known control means, to a mixing and digesting zone 4. The acidulating agent comprising a commercial or byproduct sulfuric acid of from 60 percent -97 percent or more $H_2SO_4$ is charged from an acid storage through line 2 to the digesting zone 4. Intermittently or concurrently water and/or weak phosphoric acid is fed to the digesting zone through line 3. The quantity of acidulating acid and diluent water or phosphoric acid is controlled by suitable metering devices to insure the desired optimum wetting of the rock and fluidity of the slurry and sufficient ultimate concentration of acid to insure rapid and complete reaction with the rock. Preferably, the acidulating agent, i.e., the sulfuric acid, is preheated to a temperature of the order of about 100° C. As will be appreciated, the quantity of added water or weak phosphoric acid charged to the digester may be relatively widely varied depending upon the initial concentration of the sulfuric acid employed and in typical operations is adjusted to yield an equivalent concentration of acidulating acid of 60 percent or more $H_2SO_4$.

The digestion zone or stage conveniently may comprise a covered or closed put mixer in which the ground rock is uniformly mixed with the sulfuric acid and diluent water and/or dilute phosphoric acid. The ground rock may be fed uniformly to the digester in any suitable manner, as for example, by a belt conveyor communicating with a feed bin provided with a suitable vibrator to insure free fluid flow. While the process is not limited to any particular type of apparatus utilized, it has been found that a suitable digestion stage comprises one or more standard commercial pug mixers. The covered put mixer is provided with an outlet vent or duct to remove gases, such as fluorine, formed during the reaction, which gases may be passed to a scrubbing system for recovery of fluorine values. It is to be noted that the amount of water or dilute phosphoric acid introduced into the digestion zone is designed not only to improve wettability of the rock and fluidity of the reaction slurry but also to control the rate of gas evolution and setting characteristics of the acidulate and to produce a relatively porous product as the acidulate subsequently coats the dried gypsum granules added in the described conditioning stage.

After mixing in the digestion stage 4, and after a substantial degree of reaction between the rock and acid has occurred, the resulting pasty slurry is admixed with a predetermined quantity of dried and pulverized gypsum, derived in the circuit in the manner to be described, to produce a semidry acidulate. The dried conditioning anhydrite gypsum may be added and admixed with the initial acidulate by feeding through line 16 to the mixer 4, downstream from the original point of feed, to such mixer, or may be fed through line 16' to a separate or secondary mixer 5. Such secondary mixer may comprise a rotary mixer or pug mixer similar to mixer 4 and is operated to homogeneously admix the dried gypsum conditioning agent with the initial pasty acidulate. Such secondary mixer preferably is provided with vents to remove "off" gases which may be passed to a suitable scrubber. The gypsum anhydrite conditioning agent is added to the slurry and mixer 4 or 5 at an elevated temperature of the order of 200 to 224 C. or more and the mixing is then continued for a period of time sufficient to produce a semidry granular acidulate that can be handled conveniently in conventional handling equipment. In this conditioning operation the sized particles of gypsum anhydrite introduced into the pasty acidulate provide a nucleus for the gypsum particle in the acidulate mix to precipitate on or adhere to the added anhydrite and forms a solid composite from which the $P_2O_5$ may be readily separated by leaching and washing to insure recovery of a clear relatively solid-free concentrated phosphoric acid.

The conditioned agglomerates formed in the mixer 4 or 5 are passed through the line 6 to a curing pile or den 7 where the acidulate is allowed to cure for a period of the order of from about one to three days to insure substantially complete reaction between the acidulating acid and phosphatic material of the feed. Such curing step not only assures an ultimate high overall recovery of the $P_2O_5$ values of the charge material but also serves to improve the physical structure or character of the semidry acidulate to facilitate subsequent leaching of such acidulate.

The cured product from the conditioning stage 7 is passed by way of line 8 by suitable means, such as a belt conveyor, to a drier system 9. The drier may be of any conventional type, such as a direct or indirect heated rotary drier, from which the acidulate passes counterconcurrently to the heat flow. Gases and vapors which are evolved in the drier are continuously withdrawn through line 9' and passed to the scrubber unit of the system. The temperature is the drier is controlled to heat the semidried acidulate to an outlet temperature of the order of about 200 to 220 C. In this drying operation, water and fluorine are removed from the acidulate, and under the temperature conditions maintained in the drier the granules of the acidulate are hardened or indurated, rendering such granules amenable to ready leaching and filtration with minimum breakdown or degradation. In this drying operation, the gypsum in the acidulate tends to be converted to the desired anhydrite form.

The hot dried indurated acidulate granules are withdrawn from the drier 9 and are discharged directly to a countercurrent leaching and washing system 10. In this system the hot granular acidulate is first contacted and quenched with a liquor containing at least 46 percent $P_2O_5$ admitted through line 10 and is subsequently washed concurrently is a suitable number of stages, with liquor derived by hot water added to the terminal stage of the system. The countercurrent leaching and washing system may comprise any suitable system of choice such as washing on a continuous filter, countercurrent washing in a series of wash tanks or any other effective system. It has been found that removal of $P_2O_5$ from the acidulate to produce the desired strength product acid may be achieved by quenching with phosphoric acid of the indicated strength and with successively dilute phosphoric acid in about seven stages or steps, including the quench and final water wash. The product acid from the last step, and containing approximately 50–55 percent of $P_2O_5$, is passed by way of line 11 to storage. As will be appreciated, a portion of such product acid may be recycled to the quenching stage of the leaching and washing system as by way of line 10'. Such quenched acid may also be derived from a step in the washing system where it is of the desired concentration. The residue from the leaching and washing operation is withdrawn by way of line 12, a selected quantity is passed to the gypsum drier 13 and the remainder is passed by way of line 17 to waste.

As indicated previously the anhydrite gypsum for cycling to the mixer 4 or 5 is dried at a temperature of 200 to 260 C. or more and is passed to the pulverizer 15. The pulverized, classified hot anhydrite is passed to mixer 44 or 5 through lines 16 or 16'.

In typical operations the phosphate rock used may be a commercial grade Western phosphate rock which preferably is calcined and ground to about 90 percent minus 100 mesh. In some circumstances where the organic content is not too high, undried and uncalcined ground rock may be used as the phosphatic source.

In development of the novel process the sulfuric acid employed was commercial grade 66° Be, 93 percent $H_2SO_4$ to which water or phosphoric acid was added to yield sulfuric acid concentrations as low as 60 percent $H_2SO_4$. It has been found that the quality of the granules produced for the conditioning operation were much superior when using higher concentrations of sulfuric acid. At the lower concentrations, the granules tended to be sticky and were characterized by reduced rates during filtration. It was found also that dried pulverized gypsum anhydrite prepared for the conditioning stage to yield granules of satisfactory physical characteristics is approximately inversely proportional to the strength of the sulfuric acid used for acidulation.

Those skilled in the art can more readily understand and practice the invention by consideration of the following examples of tests in which the principles of the invention are invoked. Pilot plant operations have demonstrated the utility and effectiveness of the novel process. The examples given below record small scale tests, illustrating the technique of the novel process as well as indicating the effects of modification of such factors of as acid concentration, the ratio of recycled gypsum to rock and the like.

These tests were carried out, employing the process generally shown in the FIGURE. In all the flowing examples countercurrent leaching and washing was carried out on a vacuum filter operated in a manner designed to represent the continuous filtration.

EXAMPLE 1

This test was conducted by employing a series of operations diagrammatically shown in the FIGURE. In such test calcined commercial Western phosphate rock, analyzing about 31.0 percent $P_2O_5$, 46.5 percent CaO and ground to 90 percent minus 100 mesh, was acidulated with sufficient sulfuric acid to act upon all the CaO in the rock. The acidulating agent comprised commercial 66° Be sulfuric acid to which water was added to yield an acid concentration of 70 percent $H_2SO_4$. The acid was heated to about 100° C. and thoroughly admixed with the particulate rock in an appropriate vessel.

Upon completion of the initial reaction dried and pulverized anhydrite gypsum was added to the initial reaction mass in a weight ratio of gypsum-to-rock of 1:1. The resulting semigranular acidulate was allowed to set and cure overnight.

The cured acidulate was heated to a temperature of about 200° C. and maintained for about 20 minutes. This hot acidulate was then placed on a vacuum filter, quenched with strong phosphoric acid and washed with successively dilute phosphoric acid in seven steps, including the initial quench and a final water wash. The filtration rate was found to be comparable to that for standard commercial filter operations. The final product acid was found to contain 55.5 percent P₂O₅ and represented a recovery of 91.8 percent of the P₂O₅. The results of such tests are given below:

TABLE I

| | |
|---|---|
| Rock, percent $P_2O_5$ | 31.0 |
| Sulfuric Acid concentration, % $H_2SO_4$ | 70.0 |
| Temperatures, °C. | |
|     Acidulate | 200 |
|     Quench Liquor | 100 |
|     Wash Liquors | +90 |
| Weight Ratios | |
|     Gypsum to Rock | 1.00 |
|     Quench Liquor to Acidulate | 1.85 |
|     Product to Acidulate | 1.41 |
|     Wet Cake to Acidulate | 0.92 |
| Analysis | |
|     Quench Liquor, % $P_2O_5$ | 49.6 |
|     Product Liquor, % $P_2O_5$ | 50.5 |
| $P_2O_5$ recovered from acidulate, percent | 91.8 |

EXAMPLE II

Another test was conducted, employing the same basic formulation used in Example I, except that the strength of the quench acid was increased and the weight of such quench acid to acidulate was decreased. It was found that the results were similar to those obtained in Example I, except that the overall recovery was reduced while concentration of the product acid was somewhat increased. These results are recorded below:

TABLE II

| | |
|---|---|
| Rock, percent $P_2O_5$ | 31.0 |
| Sulfuric Acid concentration, % $H_2SO_4$ | 70.0 |
| Temperatures, °C. | |
|     Acidulate | 200 |
|     Quench liquor | 100 |
|     Wash liquors | +90 |
| Weight Rations | |
|     Gypsum to Rock | 1.00 |
|     Quench Liquor to Acidulate | 1.01 |
|     Product to Acidulate | 0.36 |
|     Wet Cake to Acidulate | 1.00 |
| Analysis | |
|     Quench Liquor, % $P_2O_5$ | 55.6 |
|     Product Acid, % $P_2O_5$ | 56.7 |
| $P_2O_5$ recovered from acidulate, percent | 83.2 |

EXAMPLE III

Another test was conducted in a manner similar to that described in Example I to determine the general effect of dilution of acidulating acid to indicate the approximate lower level of acid concentration, although it was previously determined that higher acid concentrations gave superior results in that, among other things, the physical character of the granular acidulate is improved with higher acid concentrations. This difference in physical character of the acidulate is indicated by a rather marked decrease in filtration rates. The results of this example are given below:

TABLE III

| | |
|---|---|
| Rock, percent $P_2O_5$ | 31.0 |
| Sulfuric Acid concentration, % $H_2SO_4$ | 60.0 |
| Temperatures, °C. | |
|     Acidulate | 200 |
|     Quench Liquor | 100 |
|     Wash Liquors | +90 |
| Weight Ratios | |

Table III—Continued

| | |
|---|---|
|     Gypsum to Rock | 1.00 |
|     Quench Liquor to Acidulate | 1.78 |
|     Product to Acidulate | 1.32 |
|     Wet Cake to Acidulate | 0.98 |
| Analysis | |
|     Quench Liquor, % $P_2O_5$ | 51.7 |
|     Product Acid, % $P_2O_5$ | 52.8 |
| $P_2O_5$ recovered from Acidulate, percent | 91.0 |

EXAMPLE IV

This test was carried out in the manner similar to that described in Example I, except that the ratio of gypsum-to-rock was reduced and the volume of quench liquor was reduced. There were no significant variations from the results obtained in Example I. The results of this example are noted below:

TABLE IV

| | |
|---|---|
| Rock, percent $P_2O_5$ | 31.0 |
| Sulfuric Acid concentration, % $H_2SO_4$ | 70.0 |
| Temperatures, °C. | |
|     Acidulate | 200 |
|     Quench Liquor | 100 |
|     Wash Liquors | +90 |
| Weight Ratios | |
|     Gypsum to Rock | 0.75 |
|     Quench Liquor to Acidulate | 0.77 |
|     Product to Acidulate | 0.32 |
|     Wet Cake to Acidulate | 0.97 |
| Analysis | |
|     Quench Liquor, % $P_2O_5$ | 49.6 |
|     Product Acid, % $P_2O_5$ | 51.6 |
| $P_2O_5$ recovered from the Acidulate, percent | 90.7 |

EXAMPLE V

This test was also conducted in a manner similar to that described in Example IV, except that commercial grade 66% Be, 93% sulfuric acid was employed with no dilution water. The results are indicated in the following Table:

TABLE V

| | |
|---|---|
| Rock, percent $P_2O_5$ | 31.0 |
| Sulfuric Acid concentration, % $H_2SO_4$ | 93.0 |
| Temperatures, °C. | |
|     Acidulate | 200 |
|     Quench Liquor | 100 |
|     Wash Liquors | +90 |
| Weight Ratios | |
|     Gypsum to Rock | 0.75 |
|     Quench Liquor to Acidulate | 0.86 |
|     Product to Acidulate | 0.41 |
|     Wet Cake to Acidulate | 0.95 |
| Analysis | |
|     Quench Liquor, % $P_2O_5$ | 50.1 |
|     Product Acid, % $P_2O_5$ | 52.0 |
| $P_2O_5$ recovered from Acidulate, percent | 94.7 |

EXAMPLE VI

This test was also conducted in a manner similar to that of Fig. 1, except that commercial grade 66° Be, 93% sulfuric acid was used and the rock source was a very high-grade Western ore which was undried and uncalcined and ground to about 90% minus 100-mesh. It was observed that the filtration rates were very slow and the $P_2O_5$ recoveries were not as high as with calcined ores. The results of this test are given below:

TABLE VI

| | |
|---|---|
| Rock, percent $P_2O_5$ | 34.6 |
| Sulfuric Acid concentration, % $H_2SO_4$ | 93.0 |
| Temperatures, °C. | |
|     Acidulate | 200 |
|     Quench Liquor | 100 |
|     Wash Liquors | +90 |
| Weight Ratios | |

Table VI – Continued

| | |
|---|---|
| Gypsum to Rock | 1.00 |
| Quench Liquor to Acidulate | 1.07 |
| Product to Acidulate | 0.62 |
| Wet Cake to Acidulate | 0.96 |
| Analysis | |
| Quench Liquor, % $P_2O_5$ | 50.9 |
| Product Acid, % $P_2O_5$ | 52.8 |
| $P_2O_5$ recovered from the acidulate percent | 89.5 |

As will have been appreciated from the preceding description of the preferred method and the particular examples given, the invention is eminently simple and effective and may be carried out, employing readily available equipment to produce a concentrated phosphoric acid of low or negligible fluorine content without the necessity of employing expensive evaporators.

The examples above illustrate the fact that the concentration of sulfuric acid employed may be varied within fairly wide limitations, permitting the use of byproduct or dilute sulfuric acid, as distinguished from the two prior art processes discussed, which require fuming concentrated sulfuric acid for the production of the concentrated phosphoric acid. The examples also indicate that the ratio of the hot anhydrite gypsum to the pasty acidulate may be varied within substantial ranges to secure the desired physical characteristics in the cured acidulate.

It is to be observed that the use of the desired conditioning step permits the use of dilute sulfuric acid together with water or dilute phosphoric acid to insure optimum wetting of the rock with acid and concomitant effective reaction. Such initial pasty reaction product is converted to the substantially dry acidulate by conditioning with recycled gypsum anhydrite and curing.

As indicated previously, the product acid is of low fluorine content. In the process much of the fluorine content of the rock is eliminated before it enters the product acid in the mixing stage and in the subsequent drying stage and before leaching and washing of the final acidulate.

The particular process may be modified within the scope of the invention to achieve ancillary advantages. Thus, for some purposes it is desirable to remove iron and aluminum impurities. In the past this had generally been done by adding selected reactants such as potassium and boron compounds to the final acid. In the present process effective removal of such impurities may be essentially achieved by adding such selected reactants to the crude or calcined feed.

While a preferred specific process for the production of concentrated wet process phosphoric acid has been described, it is to be understood that this is given didactically to illustrate the underlined principles of the invention and not as limiting it to the described method, except as such limitations are clearly imposed by the appended claims.

I claim:

1. A method of directly producing concentrated wet-process phosphoric acid of approximately 50–55% $P_2O_5$ which comprises admixing ground phosphate rock with an acidulating agent comprised essentially of sulfuric acid containing in the approximate range of 60–97% $H_2SO_4$ for a period of time sufficient to insure a substantial degree of reaction and to form a pastelike acidulate; said acid being added in approximately stoichiometric proportions to convert the phosphate content of the rock into phosphoric acid and calcium sulfate; conditioning the acidulate by admixing it with dried pulverized gypsum anhydrite, derived from the process, said anhydrite being added in an amount such that the ratio of gypsum anhydrite to rock is in the range of 0.75 to 1, curing the admixture for a period sufficient to complete the reaction between the rock and acid; drying the conditioned acidulate at elevated temperatures to produce a substantially dry granular indurated acidulate; contacting such hot acidulate in a countercurrent leaching and washing system by first contacting the granular acidulate with a leaching liquor containing approximately 46% $P_2O_5$ and subsequently continuously washing the acidulate in a plurality of steps with a washing liquor derived by adding water to the terminal stage of the leaching and washing system; withdrawing a portion of the spent gypsum from such stage and passing it to a drier and heating it to produce a hard abrasive resistant anhydrite gypsum; pulverizing and sizing the gypsum and recycling it for admixture with the said initially produced pasty acidulate.

2. A method according to claim 1 in which the acidulating agent is admixed with dilute aqueous phosphoric acid.

3. A method according to claim 1 in which the phosphate rock is Western phosphate ore.

4. A method according to claim 3 in which the ore is previously calcined.

5. A method according to claim 1 in which the acidulating agent is heated to a temperature of approximately 100° prior to admixture with the ground phosphate.

6. A method according to claim 1 in which the acidulating agent is comprised essentially of byproduct sulfuric acid.

7. A method according to claim 1 in which a portion of the product acid is recycled to the quenching stage of the countercurrent leaching and washing system.